United States Patent [19]

Douglas, III

[11] 4,188,862

[45] Feb. 19, 1980

[54] REGISTER ASSEMBLY

[75] Inventor: Edwin S. Douglas, III, South Pasadena, Calif.

[73] Assignee: Circle K Company, City of Industry, Calif.

[21] Appl. No.: 901,818

[22] Filed: May 1, 1978

[51] Int. Cl.² .......................... F24F 7/00; F16K 3/314
[52] U.S. Cl. ....................................... 98/41 SV; 98/2; 98/41 R; 251/212
[58] Field of Search .................. 98/41 R, 41 SV, 102, 98/2, 122, 40 V; 251/212, DIG. 2; 220/206, 254, 255

[56] References Cited

U.S. PATENT DOCUMENTS

| 1,449,583 | 3/1923 | Buck | 251/212 |
| 3,068,891 | 12/1962 | Panning et al. | 251/212 X |
| 3,319,560 | 5/1967 | Schaaf | 98/41 R X |

FOREIGN PATENT DOCUMENTS

| 1069934 | 7/1954 | France | 98/41 R |
| 1246189 | 10/1960 | France | 98/41 R |
| 325775 | 1/1958 | Switzerland | 98/41 R |

Primary Examiner—William E. Wayner
Assistant Examiner—Harold Joyce
Attorney, Agent, or Firm—Christensen, O'Connor, Johnson & Kindness

[57] ABSTRACT

A register assembly includes a register louver defining a generally circular air passage in which air directing vanes are mounted. The register louver has a central hub in which a shaft is rotatably mounted. A plurality of closure segments are mounted for rotation relative to each other about the shaft axis. Each of the segments is capable of closing a portion of the circular air passage in the louver. In a first position, the closure segments are serially aligned and substantially overlapping each other, leaving a substantial portion of the air passage open. As the shaft is manually rotated, tabs and cooperating stop surfaces on adjacent ones of the closure segments cooperate to serially rotate the closure segments from the first position, through a number of intermediate positions, and toward a second position wherein only the edge portions of the closure segments are overlapping and the air passage is completely blocked.

1 Claim, 11 Drawing Figures

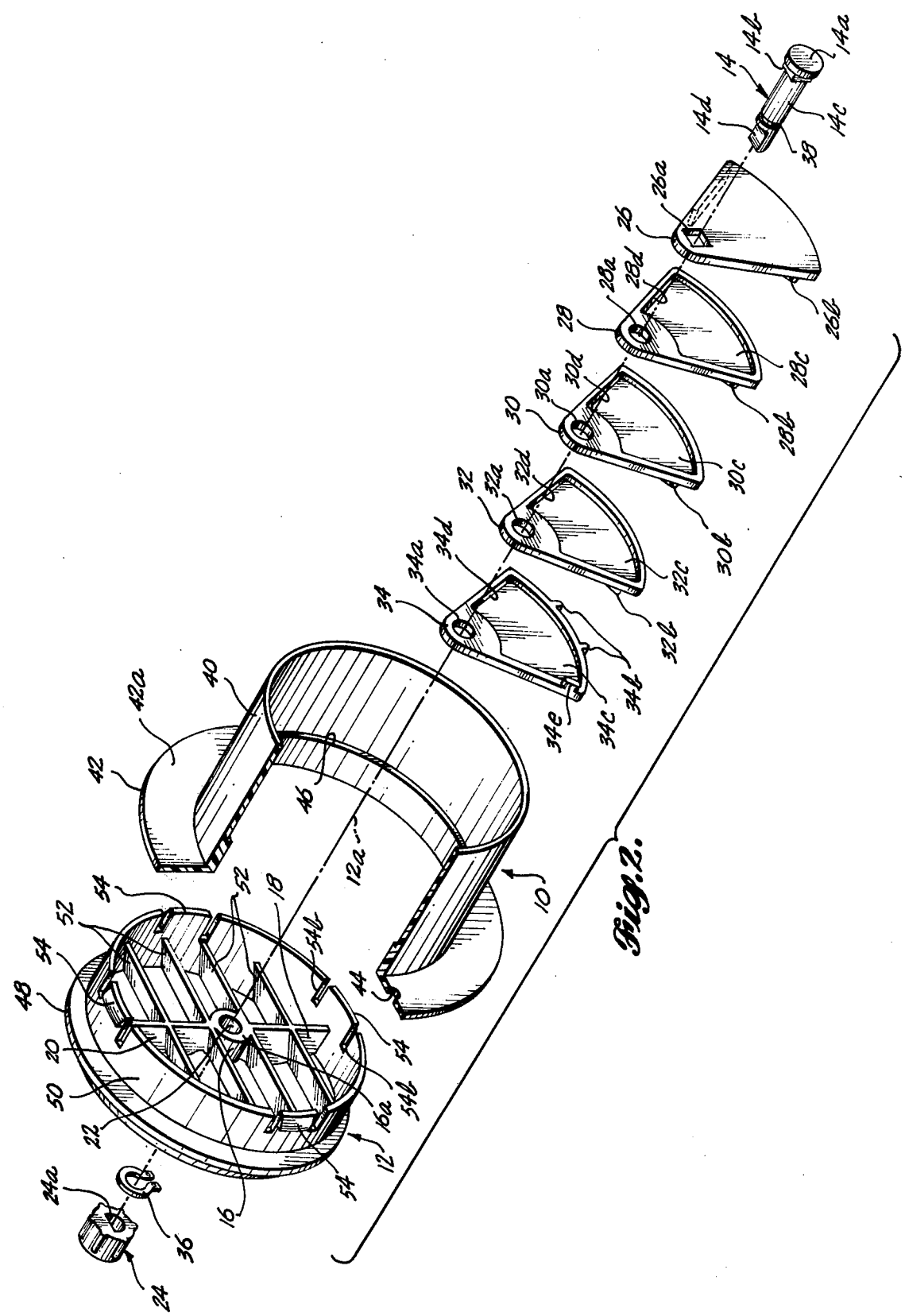

REGISTER ASSEMBLY

BACKGROUND OF THE INVENTION

The present invention relates to air conditioning registers and more particularly to air conditioning register assemblies having means for regulating the airflow therethrough.

Mobile homes, motor homes and modular homes normally incorporate both hot and cold air conditioning systems. With the advent of increased production of such homes and increased sophistication in the accessories and conveniences installed in such homes and required by consumers, it has become necessary to supply air conditioning systems including air registers that can be operated in a manner similar to those in conventional homes. For example, it is desirable to provide air conditioning registers that can direct airflow in any of a plurality of desired directions as well as adjust the volume of airflow through the register. Prior art registers that are capable of both directionally and volumetrically controlling airflow are inadequate for such homes because of their relatively large size and because of their weight.

Accordingly, it is an object of the present invention to provide a compact, lightweight air conditioning register that can be easily and conveniently installed in motor homes, mobile homes and modular homes; that requires less or at least no more space than prior art nonadjustable registers; that is easy, simple, and inexpensive to produce; that can be easily manipulated by the user of the air conditioning register; that provides for adjustment of air flow in a plurality of directions; and that provides for proportional control of the volume of air flowing from the register from a maximum value to zero.

SUMMARY OF THE INVENTION

In accordance with the foregoing objects, and other objects that will become apparent upon reading the following specification, the present invention provides a register assembly including a frame having a substantially circular opening or air passage therethrough. A support hub is centrally located in the opening and is affixed to the frame. A bore coaxially oriented with the circular air passage is provided in the hub. A shaft rotatably mounted in the bore carries a plurality of closure segments in serial arrangement relative to the axis of the shaft. The closure segments are movable about the axis of the shaft relative to each other and, when only partially overlapping each other, are sized to close the opening. Each of the closure segments is substantially smaller than the total cross sectional area of the opening so that when all of the closure segments are substantially overlapping each other, a substantial portion of the circular opening is open to airflow. An actuating means is associated with the closure segments and the shaft to serially rotate the closure segments about the axis of the shaft between a first position where they are substantially overlapping and a second position wherein the closure segments are arranged only to partially overlap and to thus close the opening to airflow.

It is preferred that three or more closure segments be employed to regulate the volume of air through the air passage. Preferably, the closure segments are fan shaped, having side portions that diverge from each other as they extend in a generally radial direction away from the shaft. The outer peripheral portion of each of the closure segments is arcuate to conform to the inner surface of the circular air passage. A first closure segment is fixed to the shaft while a second closure segment is fixed to the frame. The remaining closure segments are interposed in axial arrangement on the shaft between the first and second closure segments. All the closure segments except the first are mounted for relative rotation on the shaft. A tab on the first closure segment and the interposed closure segments extends toward the next adjacent one of the closure segments on the shaft. The tabs are located adjacent a first side portion of each of the closure segments. The second closure segment and the interposed closure segments each have a stop surface cooperable with the tab on the next adjacent closure segment. The stop surfaces are located adjacent the other side portion of the closure segments opposite from the first side portion. Thus when adjacent segments are located in the fully open, substantially overlapping position, the first of the segments can be rotated in a first direction by the shaft relative to the remaining segments to partially close the air passage. The tab on the first segment engages the stop surface on the next adjacent segment when the first segment has rotated sufficiently far so that only the first edge portion of the first segment is overlapping the opposite edge portion of the next adjacent segment. Thereafter the remaining ones of the closure segments will first remain stationary relative to the shaft as the first and its next adjacent segments are rotated, and thereafter will be sequentially rotated with the shaft as the respective tabs and stop surfaces on adjacent segments engage to proportionally close a greater portion the air passage. Means are also provided on the closure segments to proportionally open the air passage as the shaft is rotated in a direction opposite to the first direction.

The air register of the present invention provides a simple, small, lightweight assembly that can be easily installed in modular, mobile and motor homes during construction. The housing for the air register is generally circular and thus easily adaptable to connection to the circular air conditioning ducts employed in such homes. Moreover, the closure device including the closure segments comprises only a very small number of pieces and provides the capability to proportionally vary the volume of airflow through the register. The airflow is varied simply by turning a knob connected to the shaft on which the closure segments are mounted. By turning the shaft in one direction, airflow can be proportionally adjusted from maximum to zero and by turning in the opposite direction, airflow can be proportionally adjusted from zero to the maximum.

BRIEF DESCRIPTION OF THE DRAWINGS

A better understanding of the present invention can be derived by reading the ensuing specification in conjunction with the accompanying drawings, wherein:

FIG. 2 is an exploded isometric view of the register assembly of the present invention viewing the assembly from the rear;

DETAILED DESCRIPTION OF THE INVENTION

Figure 1:
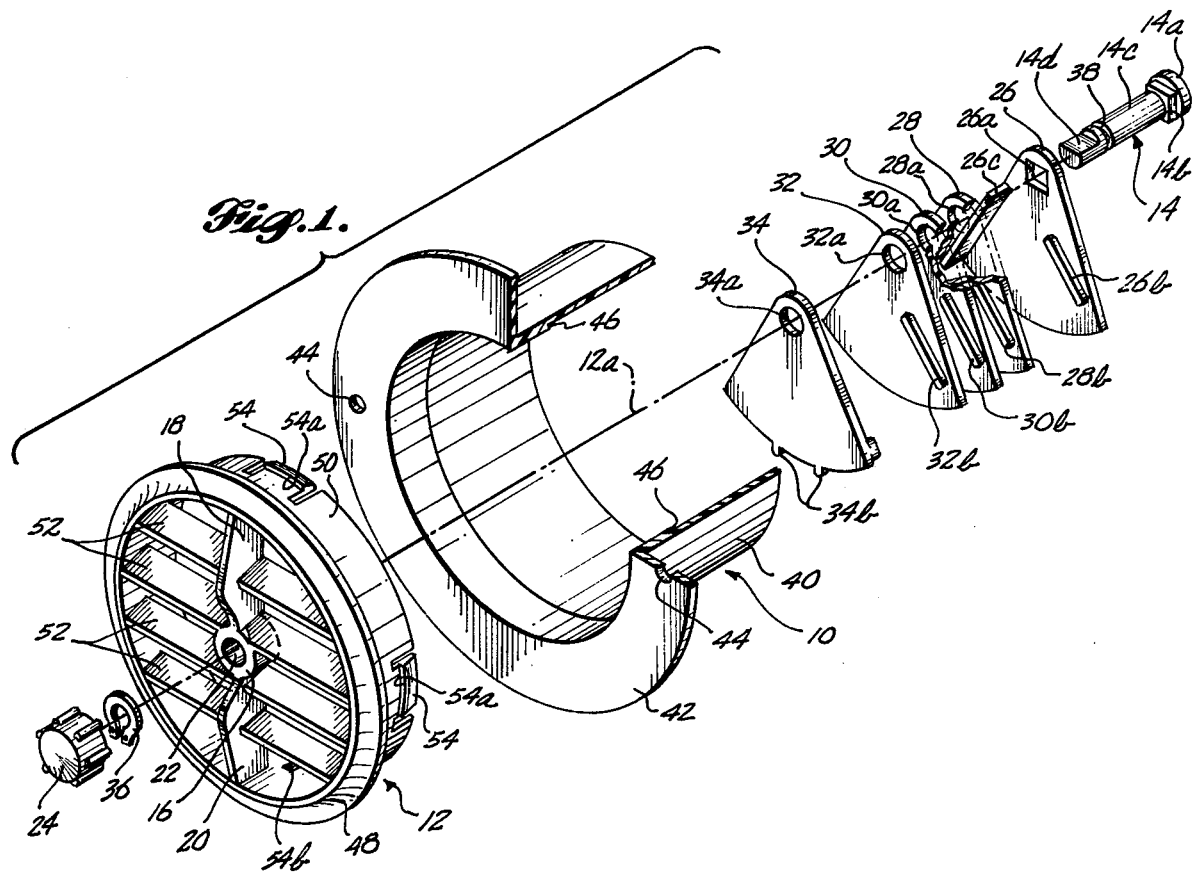
FIG. 1 is an exploded isometric view of the register assembly of the present invention viewing the assembly from the front.
Figure 3:
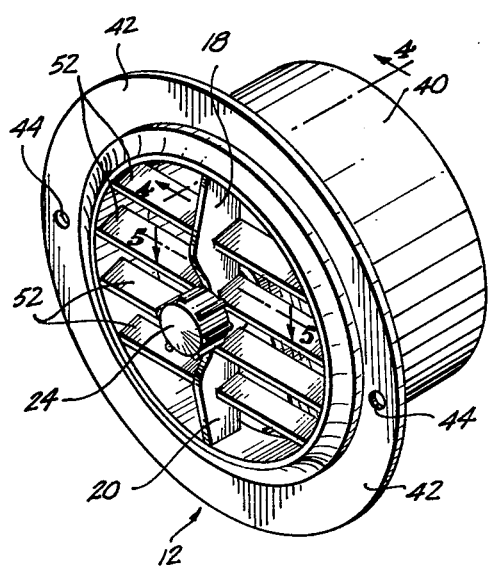
FIG. 3 is an isometric view of the assembled register assembly.
Figure 4:
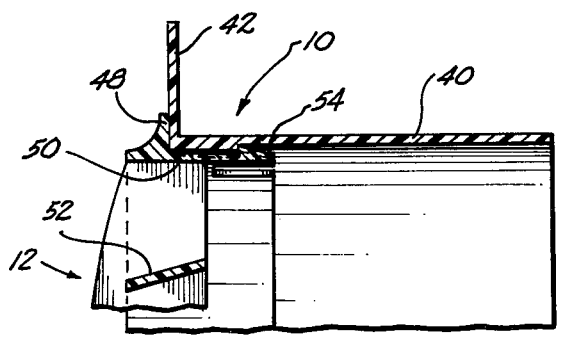
FIG. 4 is a partial cross sectional view taken along section line 4—4 of FIG. 3.

Referring first to FIGS. 1 and 2, the register assembly includes a register housing 10, a register louver 12, and a closure segment mounting shaft 14. A hub 16 is centrally located in the register louver and is supported in that position by two diametrically oriented support arms 18 and 20 that extend from the hub to the peripheral portion of the louver 12. A central bore 22 receives the shaft 14 in rotatable relationship. A knob 24 is adapted to fit on an end of the shaft 14 protruding through the hub 16 and is manually graspable to facilitate rotation of the shaft 14. A plurality of closure segments 26, 28, 30, 32 and 34 are each mounted on the shaft for rotation relative to each other about the axis, generally designated 12a, of the shaft 14 and louver 12 when the register assembly is assembled. A split retaining ring 36 engages an annular retention groove 38 on the shaft 14 to retain the shaft 14 in the hub 16.

Still referring to FIGS. 1 and 2, the housing 10 comprises a tubular central section 40 having a radially outwardly extending, annular flange 42 integrally joined to the forward end of the tubular section 40. The internal portion of the tubular section 40 defines an air passageway. An air conditioning duct (not shown) can be slipped over the outer portion of the tubular section 40 and securely clamped thereto by a suitable conventional fastener. To mount the register assembly, a hole slightly larger than the external diameter of the tubular section 40 is cut in a wall or other room defining surface. The tubular section is then slipped into the hole so that the rearward surface 42a of the annular flange 42 abuts the outer surface of the wall. Mounting holes 44 are provided in the annular flange 42 through which suitable fasteners can be inserted to secure the housing 10 to the wall. An interior, rearwardly facing shoulder 46 is spaced rearwardly from the forward end of the tubular section. The shoulder 46 is formed by an increased internal diameter portion adjacent the rearward end of the tubular section 40. The utility of the shoulder will be described in greater detail in connection with attachment of the register louver 12 to the register housing 10.

The register louver 12 comprises a tubular section 50 having an outside diameter slightly less than the internal diameter of the forward portion of the tubular section 40 of the register housing. An annularly shaped flange 48 extends radially outwardly from the forward end of and is integral with the tubular section 50 of the louver 12. The interior surface of the tubular section 50 defines an air passageway through the register louver. As previously explained, the mounting hub 16 is supported coaxially within the tubular section 50 by diametrically extending flanges 18 and 20. A plurality of parallel air guide vanes 52 extend across the outer opening of the air passageway formed by the tubular section 50 and are oriented orthogonally to the flanges 18 and 20. The vanes are canted slightly relative to the axis of the louver so that air exiting from the louver will be directed outwardly into a room at an angle relative to the axis of the louver.

Referring to FIGS. 1 through 5, four louver retention members 54 are integrally formed with the rearward portion of the tubular section 50 of the louver 12. The four retention members 54 are positioned at 90° about the tubular section 50 of the louver and are flexible in a radially inward direction. The retention members 54 carry a radially outwardly extending, forwardly facing shoulder 54a. When the register louver is slidably engaged into the register housing 10, the retention members 54 flex slightly inwardly. The shoulder 54a is positioned sufficiently far from the rearwardly facing surface of the annular flange 48 so that when the louver is slipped into the forward opening of the register housing, the retention members 54 will flex inwardly until the retention shoulder 54a passes the rearwardly facing shoulder 46 on the register housing. The retention members 54 are resilient so that as the shoulder 54a passes the shoulder 46, the retention members will flex outwardly behind the rearwardly facing shoulder in the housing and be captured behind the shoulder 46 to hold the louver in place. The external diameter of the tubular section 50 of the housing is sized so as to allow rotation of the louver through 360° in either direction, thereby allowing the air to be directed by the vanes 52 in a desired direction.

Figure 5:
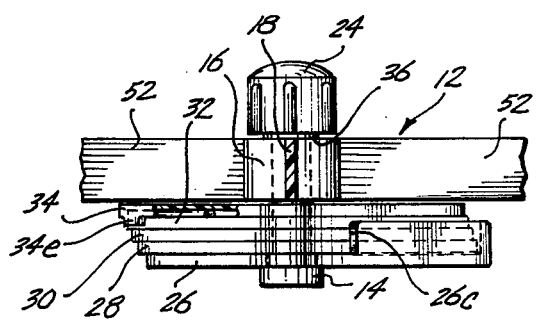
FIG. 5 is a partial cross sectional view taken along section line 5—5 of FIG. 3.

Referring now to FIGS. 1, 2 and 5, the shaft 14 has a head 14a on its inner end. Immediately forward of the head 14a is a square boss 14b having a diagonal dimension greater than the diameter of the main portion 14c of the shaft. The forward end of the shaft carries an axial notch 14d, leaving the forward end of the shaft with a cross section comprising a major segment of a circle. The knob 24 carries a shaft-receiving aperture 24a having a cross section identical to that of the notched portion of the shaft for receiving the forward end of the shaft in fixed relationship. Thus when the knob 24 is turned, the shaft must turn with the knob and cannot be freed therefrom. Preferably, the forward end of the shaft fits into the shaft-receiving aperture 24a in an interference fit so that glueing or other adhesive affixation of the knob to the shaft is not necessary. The retention groove 38 to receive the split retaining ring resides immediately behind the forward notched portion of the shaft.

Each of the closure segments 26 through 34 have generally the same shape. Each of the closure segments extends outwardly from its shaft-engaging inner end toward the inner surface of the tubular section 50 of the register louver. The side portions of each of the closure segments diverge as they extend outwardly from the shaft-engaging inner end. The outer edge of each of the segments is circular, with the diameter of the circle being centered along the axis of the shaft. The diameter of the circle defining the outer edges of each of the closure segments is only slightly less than the inner diameter of the tubular section 50 of the register louver 12. Each of the closure segments 26 through 34 carries at its inner, shaft-engaging end an aperture 26a, 28a, 30a, 32a and 34a, respectively, through which the shaft is inserted. The aperture 26a in closure segment 26 is of square cross section and receives the square boss 14b on the shaft 14. The remaining apertures 28a through 34a are circular in cross section and have a slightly larger diameter than the central portion of the shaft 14c so that the shaft can rotate relative to each of the closure segments 28 through 34. When assembled, the distance between the forwardly facing surface of the shaft head 14a and the retention groove 38 is slightly greater than the thickness of the closure segments 26 through 34 and the length of the hub 16 so that the closure segments are all securely held against the rearward surface 16a of the hub when the retaining ring 36 is inserted in the retention groove 38, but yet allowing the shaft to rotate freely in the hub (see FIG. 5.).

Referring to FIGS. 1 and 2, the forwardmost closure segment 34 carries a pair of nibs 34b that extend downwardly from the outer circular edge of the segment. The nibs 34b are spaced so that they slide into the slots 54b on each side of the bottommost retention member 54 on the register louver 12. Thus when all the closure segments 26 through 34 are assembled on the shaft 14 as illustrated in FIG. 5, the forwardmost closure segment 34 is secured to the register louver 12, allowing the shaft 14 to rotate relative thereto in the aperture 34a. Similarly, the rearwardmost closure segment 26 is secured to the shaft via the boss 14b so that it rotates with the shaft. The middle three closure segments 28, 30 and 32 in the preferred embodiment, are identical and are mounted on the shaft for rotation relative to the shaft and relative to the forwardmost and rearwardmost closure segments 34 and 26, respectively.

Referring still to FIGS. 1 and 2, the rearwardmost closure segment 26 carries an elongate tab 26b, the elongate dimension of which extends inwardly at an angle to a radius of the axis of the shaft and at an angle to the side portion of the closure segment 26. The outermost portion of the tab 26b resides adjacent a first side portion of the tab and the circular outer edge of the tab. The tab 26b is raised from the outer surface of the closure segment 26 so that it extends forwardly toward the next adjacent closure segment 28. Closure segments 28, 30 and 32 carry similar tabs 28b, 30b and 32b, respectively. Each of the closure segments 28, 30, 32 and 34 carry trapezoidally shaped recesses 28c, 30c, 32c and 34c. The recesses have a depth slightly greater than the forward extent of the tabs 26b through 32b and respectively receive the tabs when the closure segments 26 through 34 are in their assembled relationship on the shaft 14 as shown in FIG. 5. The side 28d of the trapezoidally shaped recess in closure segment 28 functions as a stop surface which is engaged by the tab 26b as the closure segment 26 is rotated in a counterclockwise direction (FIG. 2). Similarly, stop surfaces 30d, 32d and 34d cooperate with the tabs 28b, 30b and 32b, respectively. The function of these tabs will be described in greater detail in connection with FIGS. 6 through 9.

Figure 6:
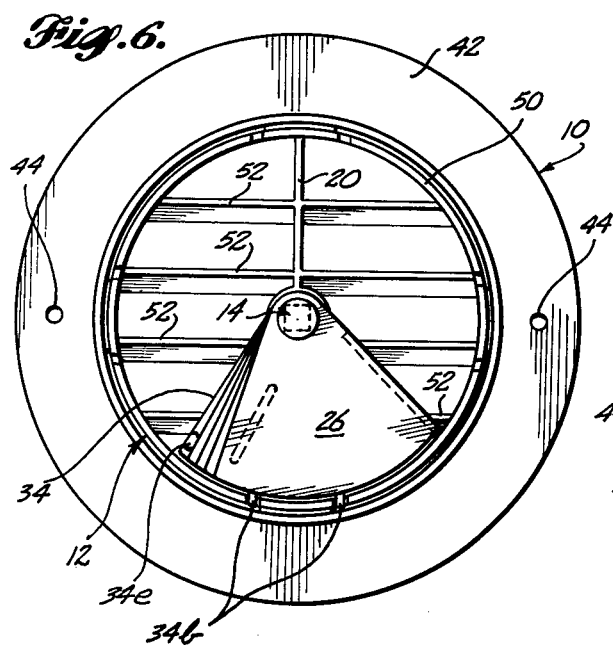
FIGS. 6 through 11 are elevation views from the rear of the register assembly showing the sequential operation of the closure segments upon rotation of the mounting shaft.
Figure 9:
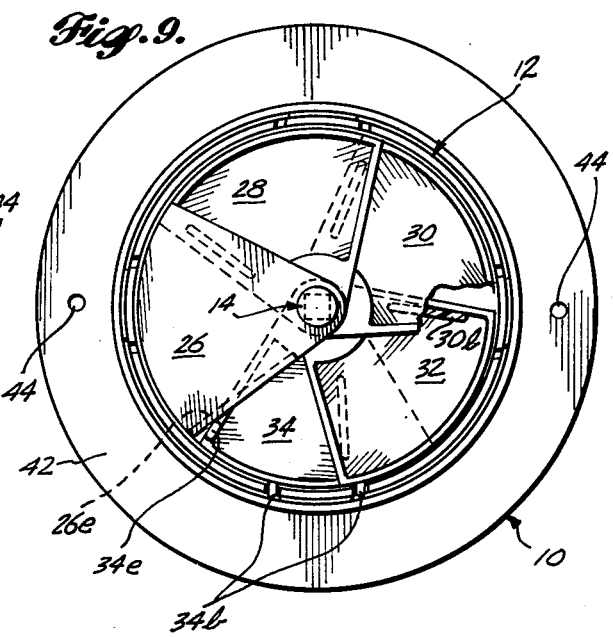

As shown in FIGS. 5 and 6, the closure segments are serially arranged in the axial direction so that each of the closure segments is substantially overlapping each of the other closure segments. Thus the cross sectional area of the register opening that is open to airflow is maximized when the closure segments are substantially overlapping, leaving only a portion of the register opening slightly greater than the area of one of the closure segments blocked. In the substantially overlapping position, maximum airflow can occur through the register opening. When it is desired to decrease the airflow through the register opening, the knob 24 (FIGS. 1, 2 and 3) is grasped between the thumb and forefinger and rotated in a counterclockwise direction (viewing the assembly from the rear as in FIGS. 2 and 7 through 10). As the shaft 14 is rotated in the counterclockwise direction, the rearmost closure segment 26 is rotated in a counterclockwise direction as shown by arrow 70. The remaining closure segments remain stationary in substantially overlapping relationship until the tab 26b on the rearmost segment 26 engages the stop surface 28d of the recess 28c in the next adjacent closure segment 28 forward of the rearmost segment. At this point, the register opening is slightly less than half blocked. As the shaft 14 is rotated further in a counterclockwise direction, the cooperation of the tab 26b and the stop surface 28d will pick up and begin to rotate the closure segment 28 along with the closure segment 26. Once the tab 28b on closure segment 28 engages the stop surface 30d on the next closure segment 30 adjacent and forward of segment 28, the closure segment 30 will sequentially be rotated along with closure segments 26 and 28. Likewise the closure segment 32 will sequentially be rotated with the closure segments 26, 28 and 30 as tab 30b engages stop surface 32d on segment 32 (see FIG. 8). When the side portion of the closure segment 26 opposite the side adjacent the tab 26b has rotated through approximately 360° less the angle prescribed by the closure segment 26 itself, the opposite side of closure segment 26 will engage a rearwardly extending flange 34e on the forwardmost closure segment 34. The rearwardly extending flange 34e serves as a stop to limit the rotational movement of the shaft 14 to less than 360°. Once the opposite side of the closure segment 26 contacts the flange 34e (as shown in FIG. 9), the register opening is completely closed to block airflow therethrough.

Figure 7:
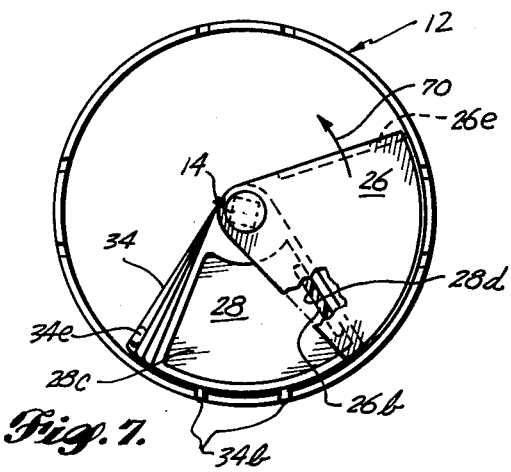
Figure 10:
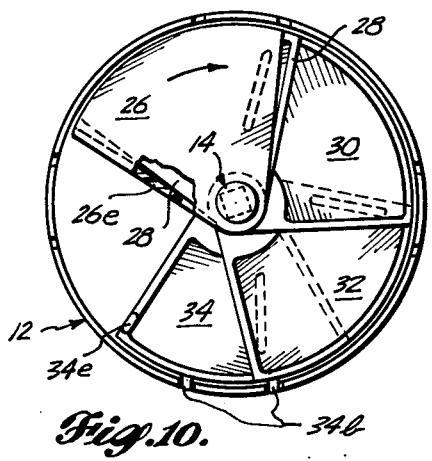
Figure 8:
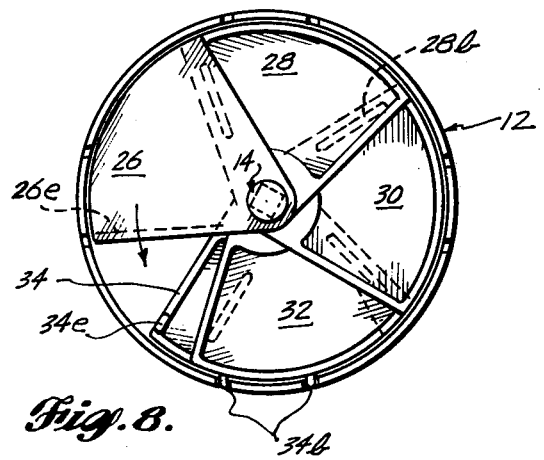
Figure 11:
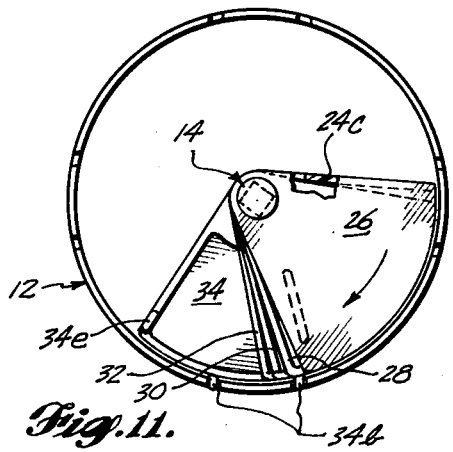

It will also be noticed with reference to FIG. 1 that the rearmost closure segment 26 carries a forwardly extending flange 26e that extends past the sides of closure segments 28, 30 and 32 opposite the sides of those segments adjacent the tabs 28b, 30b and 32b. This flange 26e serves as a pickup to sequentially rotate the closure segments 28, 30 and 32 back to their fully open position as the closure segment 26 is rotated by the shaft 14 in a clockwise direction. Referring to FIG. 10, the flange 26e is shown picking up the closure segment 28 as closure segment 26 is rotated in a clockwise direction. Each of the remaining closure segments are sequentially picked up as closure segment 26 is rotated as shown in FIG. 12. As closure segment 26 continues to be rotated, in the clockwise direction, the right hand side (when viewed from the rear) of closure segment 32 engages the flange 34e on closure segment 34 to stop or limit rotation of closure segments 26 through 32 in the clockwise direction as shown in FIG. 7. Thus the closure segment tabs and stop surfaces, as well as the stop flange 34e and the pickup flange 26e cooperate with each other to sequentially rotate the closure segments 26 through 32 as the shaft 14 is rotated in the counterclockwise direction to block airflow through the register opening (FIGS. 6 through 9), and to sequentially rotate the closure segments 26 through 32 as the shaft 14 is rotated in the clockwise direction to open the register to airflow.

The present invention has been described in relation to a preferred embodiment. One of ordinary skill in the art will be able to effect various changes, alterations and substitutions of equivalents without departing from the spirit or scope of the invention as disclosed. For example, one of ordinary skill would easily be able to interchange the location of the opening tabs and recesses on the closure segments without altering their function to sequentially rotate the closure segments upon rotation of one of the closure segments attached to the shaft. It is therefore intended that the scope of the Letters Patent granted hereon be limited only by the definition contained in the appended claims and equivalents thereof.

The embodiments of the invention in which an exclusive property or privilege is claimed are defined as follows:

1. A register assembly comprising:

a register frame having a peripheral portion defining an air passage that is substantially circular in cross section, a support hub located substantially coaxially with said air passage and means for supporting said hub in said air passage, said hub having a substantially axially oriented bore therethrough, a shaft rotatably mounted for rotation in said bore, and means attached to said shaft for manually rotating said shaft, at least three closure segments mounted on said shaft for rotational movement relative to each other about the axis of said shaft, said closure segments being arranged on said shaft in serially overlapping relationship relative to the axis of said shaft, said closure segments each extending outwardly from said shaft and having side portions that diverge outwardly from said shaft toward the peripheral portion of said frame and having outer arcuate edge portions terminating in close proximity to the peripheral portion of said frame, said closure segments each being sized to block airflow through a portion of said air passage, said closure segments further being sized so that, when each of said segments is overlapping only the edge portions of adjacent segments, said segments cooperate to block airflow through the entirety of said air passage, a first of said closure segments being affixed to said shaft for rotation therewith, a second of said closure segments being affixed to said frame, said shaft being capable of rotating relative to said second closure segment, the remaining ones of said closure segments mounted on said shaft for rotation relative thereto, said remaining ones of said closure segments being interposed between said first and second closure segments, a tab on said first closure segment and on each of said remaining ones of said closure segments, said tabs extending toward the next adjacent one of said closure segments, said tabs being located adjacent first side portions of each of said closure segments; said second closure segment and said remaining ones of said closure segments each having a stop surface cooperable with the tab on the next adjacent closure segment, said stop surfaces being located adjacent the other side portions of said closure segments opposite from said first side portions, said tabs and said stop surfaces cooperating so that the first side portions of adjacent ones of said closure segments having cooperating tab and adjacent stop surfaces can rotate in a first direction relative to the axis of said shaft toward the other side portion of the next adjacent closure segment until a respective tab and stop surface engage, whereby as said first closure segment is rotated by said shaft, said remaining ones of said closure segments will first remain stationary relative to said shaft and thereafter be sequentially rotated with said shaft as the respective tabs and stop surfaces are engaged, a flange mounted on said first closure segment adjacent the other side portion thereof, said flange extending in an axial direction toward said second closure segment and past the other side portions of said remaining ones of said closure segments, and a stop tab on said second closure segment extending in a generally axial direction relative to said shaft, said stop tab being located adjacent the first side portion of said second closure segment and extending past the first side portion of at least one of said remaining ones of said closure segments, said stop tab functioning to limit the rotational movement of said first and said remaining closure segments in said second direction when said first side portion of at least one of said remaining closure segments engages said stop tab, said stop tab further serving to limit rotational movement of said first and remaining closure segments in said first direction when said flange engages said stop tab.

* * * * *